(12) United States Patent
Margolin

(10) Patent No.: US 11,823,044 B2
(45) Date of Patent: Nov. 21, 2023

(54) QUERY-BASED RECOMMENDATION SYSTEMS USING MACHINE LEARNING-TRAINED CLASSIFIER

(71) Applicant: PayPal, Inc., San Jose, CA (US)

(72) Inventor: Itay Margolin, Pardesiya (IL)

(73) Assignee: PAYPAL, INC., San Jose, CA (US)

( * ) Notice: Subject to any disclaimer, the term of this patent is extended or adjusted under 35 U.S.C. 154(b) by 200 days.

(21) Appl. No.: 16/915,872

(22) Filed: Jun. 29, 2020

(65) Prior Publication Data
US 2021/0406218 A1 Dec. 30, 2021

(51) Int. Cl.
| | | |
|---|---|---|
| G06F 7/00 | (2006.01) | |
| G06N 3/08 | (2023.01) | |
| G06F 16/14 | (2019.01) | |
| G06F 16/17 | (2019.01) | |
| G06N 20/00 | (2019.01) | |
| G06F 18/25 | (2023.01) | |
| G06F 18/20 | (2023.01) | |
| G06F 18/2451 | (2023.01) | |

(52) U.S. Cl.
CPC ............. *G06N 3/08* (2013.01); *G06F 16/156* (2019.01); *G06F 16/173* (2019.01); *G06F 18/2451* (2023.01); *G06F 18/254* (2023.01); *G06F 18/285* (2023.01); *G06N 20/00* (2019.01)

(58) Field of Classification Search
CPC .... G06F 16/156; G06F 16/173; G06F 6/6292; G06K 9/6286; G06K 9/6227; G06N 20/00; G06N 3/0454; G06N 3/0481; G06N 3/08
See application file for complete search history.

(56) References Cited

U.S. PATENT DOCUMENTS

| | | | | |
|---|---|---|---|---|
| 8,473,499 | B2 * | 6/2013 | Song | G06Q 50/10 706/20 |
| 8,515,888 | B2 * | 8/2013 | Ventilla | H04L 51/046 706/45 |
| 10,223,646 | B1 * | 3/2019 | Vontobel | G06N 5/022 |
| 10,606,847 | B2 * | 3/2020 | Yan | G06F 16/24578 |
| 10,692,006 | B1 * | 6/2020 | Zhang | G06N 3/08 |
| 2004/0181511 | A1 * | 9/2004 | Xu | G06F 16/3347 |

(Continued)

*Primary Examiner* — Mohammed R Uddin
(74) *Attorney, Agent, or Firm* — HAYNES AND BOONE, LLP

(57) ABSTRACT

Systems and methods for query-based recommendation systems using machine learning-trained classifiers are provided. A service provider server receives, from a communication device through an application programming interface, a query in an interaction between the server provider server and the communication device. The service provider server generates a vector of first latent features from a set of first visible features associated with the query using a machine learning-trained classifier. The service provider server generates a likelihood scalar value indicating a likelihood of the query is answered by a candidate user in a set of users using a combination of the vector of first latent features and a vector of second latent features. The service provider server provides, to the communication device through the application programming interface, a recommendation message as a response to the query, where the recommendation message includes the likelihood scalar value and an indication of the candidate user.

20 Claims, 7 Drawing Sheets

(56) References Cited

U.S. PATENT DOCUMENTS

| | | | |
|---|---|---|---|
| 2009/0162824 A1* | 6/2009 | Heck | G06Q 10/10 434/362 |
| 2010/0332404 A1* | 12/2010 | Valin | G06Q 99/00 705/310 |
| 2011/0106746 A1* | 5/2011 | Ventilla | G06Q 10/10 706/50 |
| 2012/0150771 A1* | 6/2012 | Kasneci | G06N 7/005 706/12 |
| 2013/0346496 A1* | 12/2013 | Maarek | G06Q 50/01 709/204 |
| 2014/0244631 A1* | 8/2014 | Arthur | G06F 16/43 707/723 |
| 2014/0278754 A1* | 9/2014 | Cronin | G06F 17/18 705/7.29 |
| 2014/0279727 A1* | 9/2014 | Baraniuk | G09B 7/00 706/11 |
| 2015/0088906 A1* | 3/2015 | Pal | H04L 67/02 707/749 |
| 2015/0187024 A1* | 7/2015 | Karatzoglou | G06Q 30/0201 705/319 |
| 2015/0286709 A1* | 10/2015 | Sathish | G06F 16/9535 706/45 |
| 2016/0132772 A1* | 5/2016 | Little | G06Q 50/06 706/11 |
| 2017/0140474 A1* | 5/2017 | Tran | H04L 51/046 |
| 2017/0323212 A1* | 11/2017 | Volkov | G06N 5/04 |
| 2017/0371965 A1* | 12/2017 | Davar | G06F 16/951 |
| 2018/0032524 A1* | 2/2018 | Byron | G09B 7/02 |
| 2018/0046937 A1* | 2/2018 | Allen | G06N 5/04 |
| 2018/0082183 A1* | 3/2018 | Hertz | G06N 5/00 |
| 2018/0121801 A1* | 5/2018 | Zhang | G06F 40/237 |
| 2018/0130019 A1* | 5/2018 | Kolb | G06F 16/24578 |
| 2018/0150571 A1* | 5/2018 | Douglas | G06Q 10/063112 |
| 2018/0189382 A1* | 7/2018 | Mowatt | G06Q 30/0214 |
| 2018/0260857 A1* | 9/2018 | Kar | G06Q 30/0254 |
| 2019/0197487 A1* | 6/2019 | Jersin | H04L 51/32 |
| 2020/0004835 A1* | 1/2020 | Ramanath | G06F 16/248 |
| 2020/0073953 A1* | 3/2020 | Kulkarni | G06N 3/084 |
| 2020/0099790 A1* | 3/2020 | Ma | G06N 3/08 |
| 2020/0175046 A1* | 6/2020 | Wang | G06F 16/334 |
| 2020/0184307 A1* | 6/2020 | Lipka | G06N 20/00 |
| 2020/0202226 A1* | 6/2020 | Nagatani | G09B 7/02 |
| 2020/0227026 A1* | 7/2020 | Rajagopal | H04L 51/02 |
| 2020/0364511 A1* | 11/2020 | Brown | G06F 40/35 |
| 2021/0233191 A1* | 7/2021 | Shin | G06Q 50/20 |
| 2021/0248376 A1* | 8/2021 | Zhao | G06N 3/0445 |
| 2021/0382893 A1* | 12/2021 | Kumar | G06N 5/04 |

* cited by examiner

QUERY-BASED RECOMMENDATION SYSTEMS USING MACHINE LEARNING-TRAINED CLASSIFIER

TECHNICAL FIELD

The present application generally relates to recommendation systems and more particularly to query-based recommendation systems using machine learning-trained classifiers.

BACKGROUND

Managing knowledge across members of a corporate entity becomes a challenging task as the entity grows. Unlike startup entities, where all members of that entity reside at a same worksite, members of large corporate entities are typically located across different geographical locations and perform a variety of tasks. In this regard, knowledge sharing across the entity becomes important, and locating the right member that can most likely answer a question as a form of knowledge sharing is not a trivial task but rather an increasing challenge as the entity grows.

Figure 1:
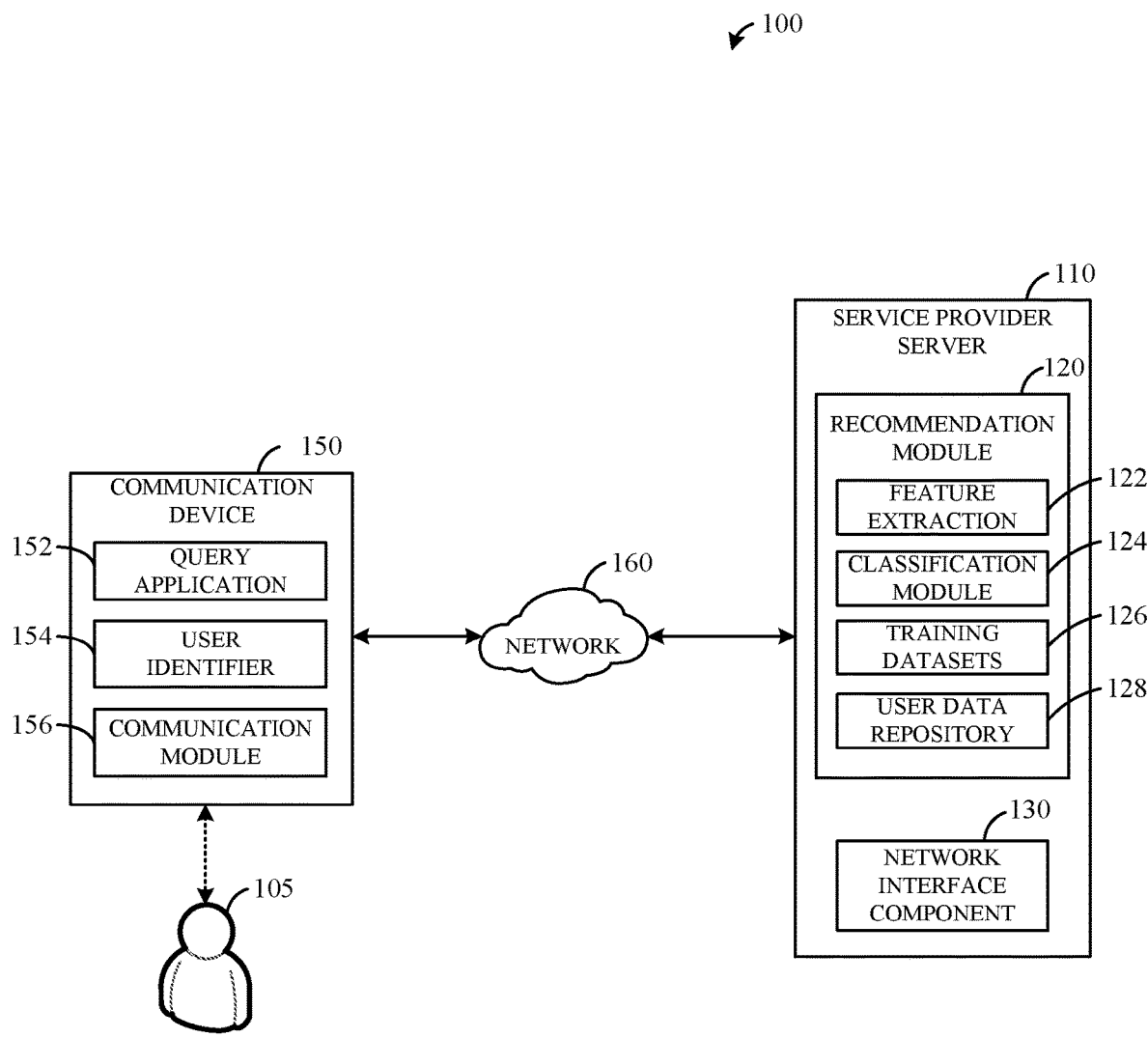
FIG. 1 illustrates a block diagram of a networked system suitable for implementing the processes described herein, according to an implementation of the present disclosure.

Implementations of the present disclosure and their advantages are best understood by referring to the detailed description that follows. It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

The subject technology provides for utilizing machine learning algorithms and treating the technical problem as a recommendation system. Improving the detection and filtering of relationships between users and queries can result in more efficient usage of computing resources—there is less network bandwidth used for individual requests made for each detected user-query relationship, for example, and computing load is reduced on a processing server that may have to attempt to process multiple queries for all possible users of a pool. User device bandwidth and computing power is also saved in the event that a user computing device does not have to submit an unnecessary query to a user that is likely to answer the query.

The subject technology can generate recommended suggestions for queries by finding the most likely user associated with an entity (e.g., an employee) to answer the query. The subject technology can represent both query and user as vectors that are aliased as latent features, such that their dot product can yield a single scalar value as the score, at which the scalar value can be bounded between 0 and 1 and can represent the likelihood of the query to be answered by a candidate user. For example, an employee of a company may have a question that is subject matter specific and would like to know whom within the company may know the answer to the question. Rather than relying on a limited circle of contacts within the company or shifting through multiple directories to identify an employee with the proper background and/or knowledge, the subject technology provides for identifying, using a machine learning-trained classifier, a candidate employee with a highest likelihood that the candidate employee can adequately the answer the question based on what the machine learning-trained classifier learned about the query and the identified candidate employee. In this respect, the machine learning-trained classifier can learn what features of a given candidate user correlate the most to features of the query by determining respective likelihood values for multiple relationships between the query features and candidate user features. Based on the likelihood score of a relationship, the candidate user with the highest likelihood of answering the query is identified and presented to the user that submitted the query. In this regard, the requesting user can directly contact the candidate user in order to receive knowledge that the requesting user is seeking.

The subject technology may be applicable to other use cases, such as matching a sender of an electronic correspondence (e.g., e-mail) with one or more candidate recipient users that are most likely to have an interest in the content of the e-mail. In this regard, the subject technology can represent both e-mail and recipient user as vectors that are aliased as latent features, such that their dot product can yield a single scalar value as the score, at which the scalar value can be bounded between 0 and 1 and can represent the likelihood of the e-mail to be received and read by a candidate user. For example, an employee of a company may have a correspondence with a message that is subject matter specific and would like to know whom within the company may have the most interest in the message and/or is the most relevant audience member to receive the message.

In some implementations, a service provider server receives, from a communication device through an application programming interface, a query in an interaction between the server provider server and the communication device. The service provider server generates a vector of first latent features from a set of first visible features associated with the query using a machine learning-trained classifier. The service provider server generates a likelihood scalar value indicating a likelihood of the query is answered by a candidate user in a set of users using a combination of the vector of first latent features and a vector of second latent features. The service provider server provides, to the communication device through the application programming interface, a recommendation message as a response to the query, where the recommendation message includes the likelihood scalar value and an indication of the candidate user.

FIG. 1 is a block diagram of a networked system 100 suitable for implementing the processes described herein, according to an implementation of the present disclosure. The networked system 100 includes a service provider server 110 associated with an electronic payment provider, and a communication device 150 that may be communicatively coupled with each other via a network 160.

In various implementations, service provider server 110 includes at least one network interface component 130 adapted to communicate with communication device 150 and/or other entities over network 160. In various implementations, network interface component 130 may include a modem, an Ethernet device, a broadband device, a satellite device and/or various other types of wired and/or wireless network communication devices including microwave, radio frequency (RF), and infrared (IR) communication devices. Network 160 may be implemented as a single network or a combination of multiple networks. For example, in various implementations, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of the networked system 100.

The service provider server 110, in one implementation, may be maintained by a transaction processing entity or an electronic service provider, which may provide electronic services (e.g., providing knowledge management through query-answer recommendations, performing electronic transactions, etc.). As such, the service provider server 110 may include a recommendation module 120, which may be adapted to interact with the communication device 150 over the network 160 using the network interface component 130 to facilitate the processing of a query and provision of a recommendation indicating a likely user to answer the query, and/or other services offered by the service provider server 110. In one example, the service provider server 110 may be provided by PayPal®, Inc. of San Jose, Calif., USA, and/or one or more financial institutions or a respective intermediary that may provide multiple client-side devices at various locations to facilitate query routings between client devices and, for example, employees for facilitating knowledge sharing. In various implementations, the recommendation module 120 includes a feature extraction module 122, a classification module 124, training datasets 126 and user data repository 128, which are discussed in more detail in FIG. 2.

In some implementations, the recommendation module 120 can provide a provide a prediction (e.g., a likelihood value of answering a query) for each employee of a corporate entity implemented by the service provider server 110 and a sorted listing of employees based on a corresponding prediction with respect to a given query. In some implementations, the recommendation module 120 provides a query-based recommendation using the classification module 124 for identifying which end users (e.g., employees) are most likely to answer a user-provided query based on a relationship between latent representations of the end-users and latent representations of the query.

The feature extraction module 122 may perform feature extraction from a query received from the communication device 150. The feature extraction module 122 may utilize ordinary feature extraction algorithms (e.g., bag-of-words) to identify and extract terms from the query. The feature extraction may include removal (or purging) of unnecessary terms and/or punctuations from the query provide clean raw data for processing by the classification module 124.

The classification module 124 may include one or more machine learning-based networks, such as a fully-connected neural network, to determine different relationships between a user and multiple queries and/or different relationships between multiple users and a given query. In some aspects, the classification module 124 may be implemented as a binary classifier, where a binary decision is made as to whether a candidate user can answer a given query based on the correlating features. The training datasets 126 can include data of prior queries submitted to the service provider server 110 that indicate the contents of such queries and which candidate users responded to the queries. Information about the candidate users that answered the queries also may be included in the training datasets 126 to determine with a level of granularity what features of the candidate users can correlate more to certain features of a query.

The user data repository 128 may be a data structure that stores, or records thereon, information relating to a set of users of an entity associated with the service provider server 110. The set of users may belong to the same entity as that of a requesting user such that the user data repository 128 can serve as an intra-entity repository of user information for that entity. In some aspects, the user data repository 128 may contain attributes related to each user in the set of users. Such attributes can refer to personal information related to the user (e.g., one or more user names, passwords, photograph images, biometric IDs, addresses, phone numbers, social security number, etc.), educational history (e.g., degree earned, date of degree, school or university name, enrollment dates, degree subject matter, related subject matter of interest, research projects, school organizations, etc.) and employment history (e.g., job title, current employer name, employee identifier, length of time at current employer, supervisor name, department name, area of subject matter expertise, ongoing project names, related project names, performance reviews, prior employer names, length of time at prior employers, etc.). The user data repository 128 may index each user information by a predetermined taxonomy that increases the storage efficiency and reduces the search latency in identifying candidate users by classification of a given query with the classification module 124.

The communication device 150, in various implementations, may be implemented using any appropriate combination of hardware and/or software configured for wired and/or wireless communication over the network 160. In various implementations, the communication device 150 may be implemented using any appropriate hardware and software configured for wired and/or wireless communication over network 160. For example, in one embodiment, the user device may be implemented as a personal computer (PC), a smart phone, a smart phone with additional hardware such as near-field communication (NFC) chips, BLUETOOTH™ low energy (BLE) hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data.

The communication device 150 may install and execute a query application 152 received from the transaction processing server 110 to facilitate one or more transaction processes (e.g., queries for knowledge sharing recommendations). The query application 152 may allow a user 105 to send a query (e.g., a knowledge sharing request) to the service provider server 110, which includes communication of data or information needed to complete the request, such as identification of the requested knowledge sharing.

The communication device 150, in one implementation, may include at least one user identifier 155, which may be implemented, for example, as one or more attributes related to the user 105 of the communication device 150, such as personal information related to the user (e.g., one or more user names, passwords, photograph images, biometric IDs, addresses, phone numbers, social security number, etc.), educational history (e.g., degree earned, date of degree, school or university name, enrollment dates, degree subject matter, related subject matter of interest, research projects, school organizations, etc.) and employment history (e.g., job title, current employer name, employee identifier, length of time at current employer, supervisor name, department name, area of subject matter expertise, ongoing project names, related project names, performance reviews, prior employer names, length of time at prior employers, etc.). In various implementations, the user identifier 155 may be passed with a user login request to the service provider server 110 via the network 160, and the user identifier 155 may be used by the service provider server 110 to associate the user with a particular user account (e.g., employee personnel account) maintained by the service provider server 110.

The communication device 150 includes at least one communication module 156 adapted to communicate with the service provider server 110. In various implementations, communication module 156 may include a modem, an Ethernet device, a broadband device, a satellite device and/or various other types of wired and/or wireless network communication devices including microwave, radio frequency, infrared, Bluetooth, and near field communication devices.

Even though only one communication device 150 is shown in FIG. 1, it has been contemplated that one or more user devices (each similar to communication device 150) may be communicatively coupled with the service provider server 110 via the network 160 within the networked system 100.

The user 105, such as an employee of a corporate entity associated with the service provider server 110, may utilize communication device 150 to perform an electronic transaction using service provider server 110. For example, a user may utilize communication device 150 to submit a query to the service provider server 110 to obtain a recommendation from the service provider server 110 that indicates a candidate user (e.g., another employee of the corporate entity) that is most likely to respond to the query with information that is relevant (or most relevant) to the query.

Figure 2:
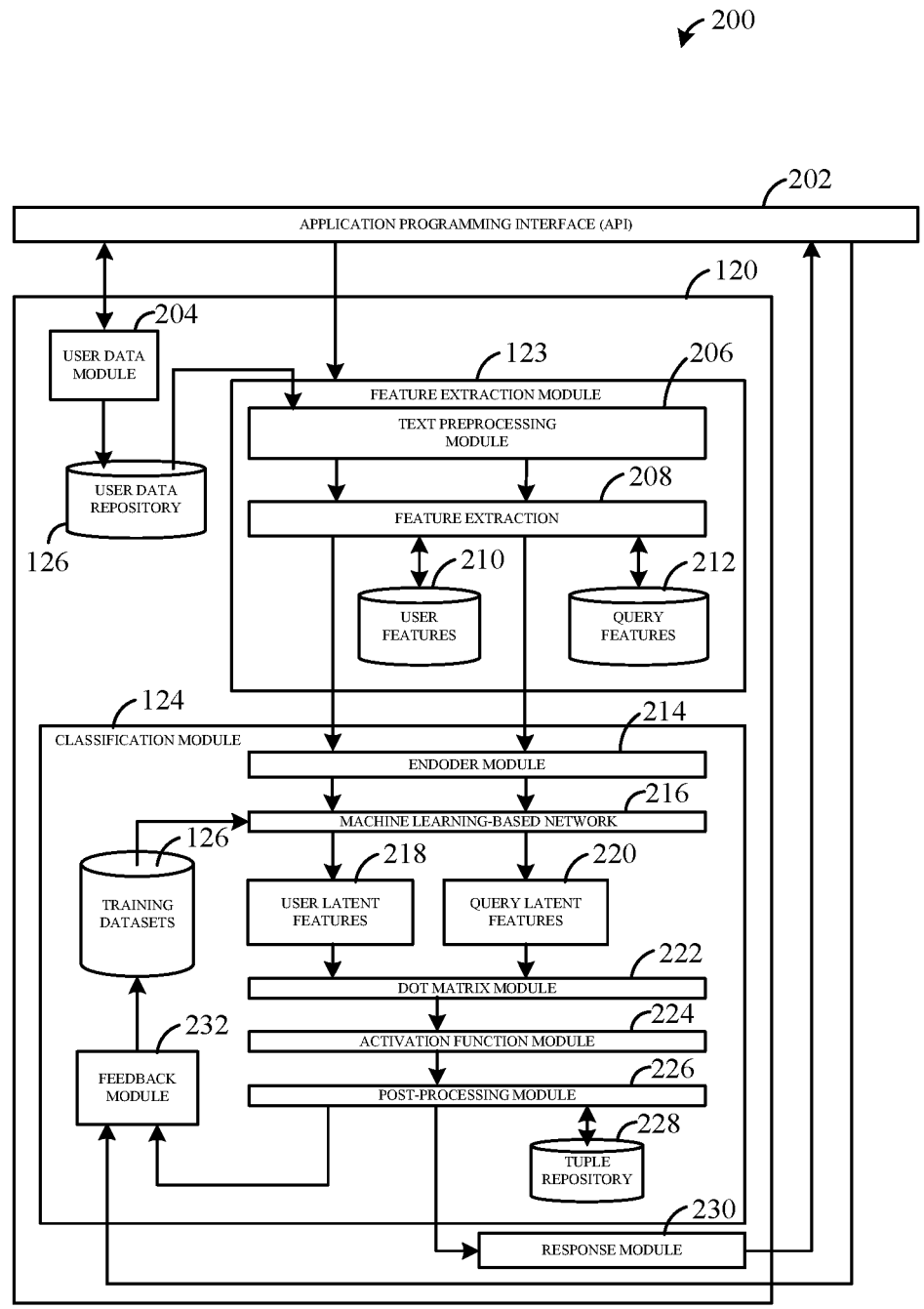
FIG. 2 illustrates a block diagram of a recommendation module, according to an implementation of the present disclosure.

FIG. 2 illustrates a block diagram of a recommendation system 200, according to an implementation of the present disclosure. The recommendation module 120 may correspond to one or more processes to execute software modules and associated specialized hardware of the service provider server 110 to analyze a received query and provision a recommendation responsive to the query. The recommendation system includes the recommendation module 120 and an application programming interface (API) 202. In some aspects, the API 202 is, or includes at least a portion of, the network interface component 130. Recommendation module 120 includes the feature extraction module 122, the classification module 124 and the user data repository 128.

The recommendation module 120 also includes a user data module 204 and a response module 230. In this regard, the API 202 feeds input signaling to the feature extraction module 123, which is then fed to the classification module 124.

The feature extraction module 122 includes a text preprocessing module 206, a feature extraction engine 208, a user features repository 210, and a query features repository 212. The API 202 passes an incoming query from the communication device 150 to the feature extraction module 123. The text preprocessing module 206 receives the query and can perform text-related preprocessing operations on the query to prepare the data for feature extraction. Some operations may include removal of any unnecessary terms and/or punctuations to provide clear raw data to the feature extraction engine 208. The recommendation module 120 may extract, using the feature extraction engine 208, one or more features of the query into a feature representation vector. The one or more features may refer to portions of the query, such as one or more attributes of the query. For example, the query attributes may indicate sender information that identifies user who submitted (or generated) the query, subject of the query, and/or content of the query. The feature extraction engine 208 may extract features from the query using an extraction algorithm (e.g., bag-of-words, TF-IDF, Doc2Vec, Latent Dirichlet Allocation, etc.). The feature extraction engine 208 can feed the extracted query features to the query features repository 212 for storage and read access.

In some aspects, the API 202 may provide an interface to the user data module 204, where user information is identified and obtained by the user data module for storage as user attributes in the user data repository 128. In some aspects, the user data module 204 may be adapted to access a remote database that contains the user information. The remote database may be accessible over the network 160 or may be accessible within the service provide server 110, depending on implementation. In some aspects, the user data module 204 may engage in a client-server interaction with client devices (e.g., the communication device 150 or the like) that prompts users for the user information. In some aspects, the client-server interaction between the user data module 204 and the client devices may be performed over a secured communication channel that prompts the client devices for login credential input to provide access to the user data module 204. The user data repository 128 may feed the obtained user information to the feature extraction module 122. The text preprocessing module 206 can process the user information to provide raw user information data to the feature extraction engine 208. The feature extraction engine 208 can store the extracted user features in the user features repository 210 for storage and read access. The feature extraction module 122 can provide the user features and query features to the classification module 124.

In some implementations, the classification module 124 includes a machine learning-trained classifier 216 and a training dataset or database 126 for training the machine learning-trained classifier 216. The classification module 124 also includes an encoder module 214, a user latent features module 218, a query latent features module 220, a dot matrix module 222, an activation function module 224, a post-processing module 226, a tuplet repository 228, and a feedback module 232. In some aspects, the encoder module 214 is coupled to an input to the machine learning-trained classifier 216 and the user latent features module 218 and query latent features module 220 are coupled to an output of the machine learning-trained classifier 216.

The machine learning-trained classifier 216, in one implementation, may be adapted to analyze one or more query features and one or more user features and generate a likelihood metric that indicates a likelihood that the query is answered by a particular candidate user. In some aspects, the machine learning-trained classifier 216 may concurrently analyze the query features and the user features using multiple (and/or separate) neural networks.

In some implementations, the machine learning-trained classifier 216 is a feed-forward network. The structure of the machine learning-trained classifier 216 may include a neural network with a particular pattern of layers or number of neurons per layer that are used to provide scoring information, such as an answer likelihood metric. The neural network structure can be based on input components. The input components can be based on query data and/or user data. In some aspects, the input components represent the extracted features from the query data and/or the user data. In some implementations, the structure of the machine learning-trained classifier 216 includes multiple neural networks, such that one of the neural networks is selected to perform the query-based recommendation operation. In some aspects, the recommendation module 120 can select a classification engine that includes a neural network among multiple classification engines that include respective neural networks. Each of the different neural networks may correspond to a respective input user and/or to a respective input query.

The machine learning-trained classifier 216 may implement specific algorithms to process the query data and/or the user data to determine the answer likelihood metric. For example, the machine learning-trained classifier 216 may be implemented by a log regression algorithm to perform either a binary classification or multi-class classification.

In some aspects, the input data to the machine learning-trained classifier 216 can be normalized, transformed, have outliers removed, or otherwise processed so that its characteristics can help the machine learning-trained classifier 216 produce quality results. For example, the input query data that is fed from the communication device 150 can be automatically transformed into a standard format. The input query data may be further transformed into several components to be used in the machine learning-trained classifier 216.

The machine learning-trained classifier 216 or other front-end parsing module (e.g., the encoder module 214) may generate the input components using a pre-trained language module, such as Bidirectional Encoding Representations from Transformers (BERT). For example, the input components may be created as an encoded representation of the input data (e.g., query data, user data). In some aspects, the encoder module 214 can apply weights initializations to the input data using BERT.

The machine learning-trained classifier 216 may be trained using the training datasets 126. The machine learning-trained classifier 216 can be trained with the user data and/or query data already stored in the service provider server 110 as training data (e.g., training datasets 126). In some aspects, aspects of the machine learning-trained classifier 216 can trained with specific subsets of the training datasets 126. The machine learning-trained classifier 216 can be trained with historical query data that covers a specified range of time (e.g., the last 18 months of queries). The machine learning-trained classifier 216 can be updated with further training on later phases and through a process for periodic review. In some aspects, the training of the machine learning-trained classifier 216 may employ a form of parallel processing in order to reduce training time. For example, the training may be performed in a closed offline environment with map reduce technology.

Training datasets 126 may store data necessary for training and utilizing the machine learning-trained classifier 216, such as training data that may include historical queries and/or historical user data used to train the machine learning-trained classifier 216 or artificial intelligence (AI) model and any question-answer activity feedback from the communication device 150.

The output of the machine learning-trained classifier 216 may include the user latent features 218 and/or the query latent features 220. In some implementations, each of the user latent features 218 and the query latent features 220 is a latent feature vector. For example, the user latent features 218 can be referred to as a user latent features vector and the query latent features 220 can be referred to as a query latent features vector. In some aspects, both the user latent features 218 and the query latent features 220 are concurrently fed to the dot matrix module 222. The dot matrix module 222 can perform a dot product operation on the user latent features 218 and the query latent features 220. This can be done for all scalals in the user latent features vector and the query latent features vector. For example, the dot matrix module 222 can take a first scalal of the user latent features 218 and a corresponding scalal of the query latent features 220, and the dot matrix module 222 can perform a product operation of the corresponding scalals to return a single value. In this regard, the dot matrix module 222 can perform a dot product operation to determine a dot product scalar value that corresponds to the sum of all the products of the corresponding entries of the two vectors.

The dot product scalar value can be normalized between a bound of values (e.g., between 0 and 1). For example, the dot product scalar value can be fed to the activation function module 224, which can perform an activation function on the dot product scalar value. In some examples, the activation function module 224 uses a rectified linear unit activation function, where positive dot product scalar values are passed through and non-positive dot product scalar values are zeroed. In this respect, the dot product scalar value can be bounded between 0 and 1. In other examples, the activation function module 224 uses a sigmoid function. In still other examples, the activation function module 224 uses a softmax function.

The recommendation module 120, using the post-processing module 226, may perform post-processing and interpretation of the output data from the machine learning-trained classifier 216. For example, the output of the machine learning-trained classifier 216 may be transformed, normalized or run through another algorithm to provide useful output data. The output of the post-processing module 226 can be fed to the response module 230 and to the feedback module 232. In various aspects, the post-processing module 226 generates the output as a tuple of information that includes the query, the candidate user, and the dot product scalar value as the corresponding answer likelihood scalar value. In some examples, the tuple of information indicates a $j^{th}$ query and a given candidate user. In other examples, the tuple of information indicates a given query and $i^{th}$ candidate user. In still other examples, the tuple of information indicates $j^{th}$ query and $i^{th}$ candidate user. In some aspects, the response module 230 may access the tuple repository 228 to obtain a tuple of information for generating a response to the query with the tuple of information.

The machine learning-trained classifier 216 can utilize a back-propagation network for feedback/retraining. For example, the feedback module 232 can receive feedback from the post-processing module 226 and/or the communication device 150 through the API 202. The classification module 124, using the feedback module 232, can generate training data that includes the received feedback for storage in the training datasets 126. As such, the machine learning-trained classifier 216 can be retrained with the updated training datasets 126.

In operation, the recommendation module 120 receives, from a communication device (e.g., the communication device 150) through the API 202, a query in an interaction between the recommendation module 120 and the communication device 150. In some implementations, the recommendation module 120, using the feature extraction engine 208, can extract a plurality of first features from the query to generate the set of first visible features that are then stored in the user features repository 210. The recommendation module 120, using the machine learning-trained classifier 216, can generate a vector of first latent features from a set of first visible features associated with the query. In some aspects, the vector of first latent features indicates a latent representation of the set of first visible features in a same feature space as that of the set of first visible features. In some aspects, the vector of first latent features includes a plurality of first latent feature fields, in which each of the plurality of first latent feature fields includes a different linear combination of the plurality of first features in the set of first visible features.

The recommendation module 120 generates a likelihood scalar value indicating a likelihood of the query is answered by a candidate user in a set of users using a combination of the vector of first latent features (e.g., 218) and a vector of second latent features different from the vector of first latent features (e.g., 220). The recommendation module 120 also can extract a plurality of second features of the candidate user from a user profile associated with the candidate user to generate a set of second visible features for the candidate user. In some aspects, the user profile can be obtained from the user data repository 128. The recommendation module 120 can generate the vector of second latent features from the set of second visible features using the machine learning-trained classifier 216. In some aspects, the vector of second latent features includes latent representations of the set of second visible features. In some aspects, the vector of second latent features indicates a latent representation of the set of second visible features in a same feature space as that of the set of second visible features. In some aspects, the vector of second latent features includes a plurality of second latent feature fields, in which each of the plurality of second latent feature fields includes a different linear combination of the plurality of second features in the set of second visible features. In this regard, the plurality of first latent feature fields and the plurality of second latent feature fields may respectively include a number of latent feature fields that is adjustable by a predetermined hyperparameter.

In some aspects, the recommendation module 120, using the machine learning-trained classifier 216, can generate first visible-to-latent connections between the set of first visible features and the vector of first latent features. In some aspects, the recommendation module 120, using the machine learning-trained classifier 216, can generate second visible-to-latent connections between the set of second visible features and the vector of second latent features. In some implementations, the generating of the second visible-to-latent connections can occur concurrently with the generating of the first visible-to-latent connections.

In generating the vector of first latent features, the recommendation module 120, using the encoder module 214, can generate a first embedding representation of the set of first visible features with a pre-trained language model and apply the first embedding representation to the machine learning-trained classifier 216 to generate the vector of first latent features. In generating the vector of second latent features, the recommendation module 120, using the encoder module 214, can generate a second embedding representation of the set of second visible features with the pre-trained language model and apply the second embedding representation to the machine learning-trained classifier 216 to generate the vector of second latent features.

In generating the likelihood scalar value, the recommendation module 120, using the dot matrix module 222, can perform a matrix dot product operation on a plurality of latent feature pairs to generate the answer likelihood scalar value. In some aspects, each latent feature pair of the plurality of latent feature pairs comprises a pairing between a first latent feature in the vector of first latent features and a second latent feature in the vector of second latent features. In some implementations, the recommendation module 120 applies an activation function operation to an output of the matrix dot product operation using the activation function module 224 to generate the answer likelihood scalar value.

In some implementations, the recommendation module 120 can generate a vector of likelihood scalar values comprising a plurality of likelihood scalar values that correspond to different candidate users in the set of users. The recommendation module 120 also can generate an ordered listing of candidate users from the set of users that are associated with a respective likelihood scalar value in the vector of likelihood scalar values. In generating the ordered listing of candidate users, the recommendation module 120 can rank each likelihood scalar value in the vector of likelihood scalar values at an output of the matrix dot product operation. In some implementations, the recommendation module 120 can apply an activation function operation to the vector of likelihood scalar values to generate the vector of likelihood scalar values.

The recommendation module 120 provides, to the communication device 150 through the API 202, a recommendation message as a response to the query. In some aspects, the recommendation message includes the likelihood scalar value and an indication of the candidate user. In some aspects, the recommendation module 120, using the response module 230, generates the recommendation message and provides the recommendation message to the API 202 for transmission to the communication device 150 over the network 160.

In some implementations, the recommendation module 120, using the post-processing module 226, can generate a tuple of information indicating the candidate user, the query, and the answer likelihood scalar value. In some aspects, the recommendation message is generated with the tuple of information. In other implementations, the recommendation module 120 can process the tuple of information with an iterative algorithm to optimize the tuple of information and generate training data from the optimized tuple of information. In this regard, the recommendation module 120 can train the machine learning-trained classifier 216 with the training data in an offline mode.

In some implementations, the recommendation module 120 can identify one or more candidate users in the set of users that are associated with a likelihood scalar value that does not exceed a predetermined threshold. In some examples, the recommendation module 120 can prompt users with likelihood values in a range of 0.4 to 0.6. In this respect, the predetermined threshold may correspond to a likelihood value threshold of about 0.7 such that candidate users corresponding to answer likelihood values that fall below 0.7 are identified and prompted to provide additional user information that is responsive to a query (corresponding to the large entropy scalar values) via their corresponding communication devices. The recommendation module 120 may send a request to communication devices of the identified one or more candidate users that prompts the one or more candidate users to answer a given query associated with the likelihood scalar value. The recommendation module 120 can receive responses from communication devices of the identified one or more candidate users and generate additional tuples of information for the identified one or more candidate users based on the responses. The recommendation module 120 can process the additional tuples of information with an iterative algorithm to optimize the additional tuples of information and generate training data from the optimized additional tuples of information. In this regard, the recommendation module 120 can train the machine learning-trained classifier 216 with the training data in an offline mode. In some aspects, the additional tuples of information can be stored as part of the training datasets 126.

Figure 3:
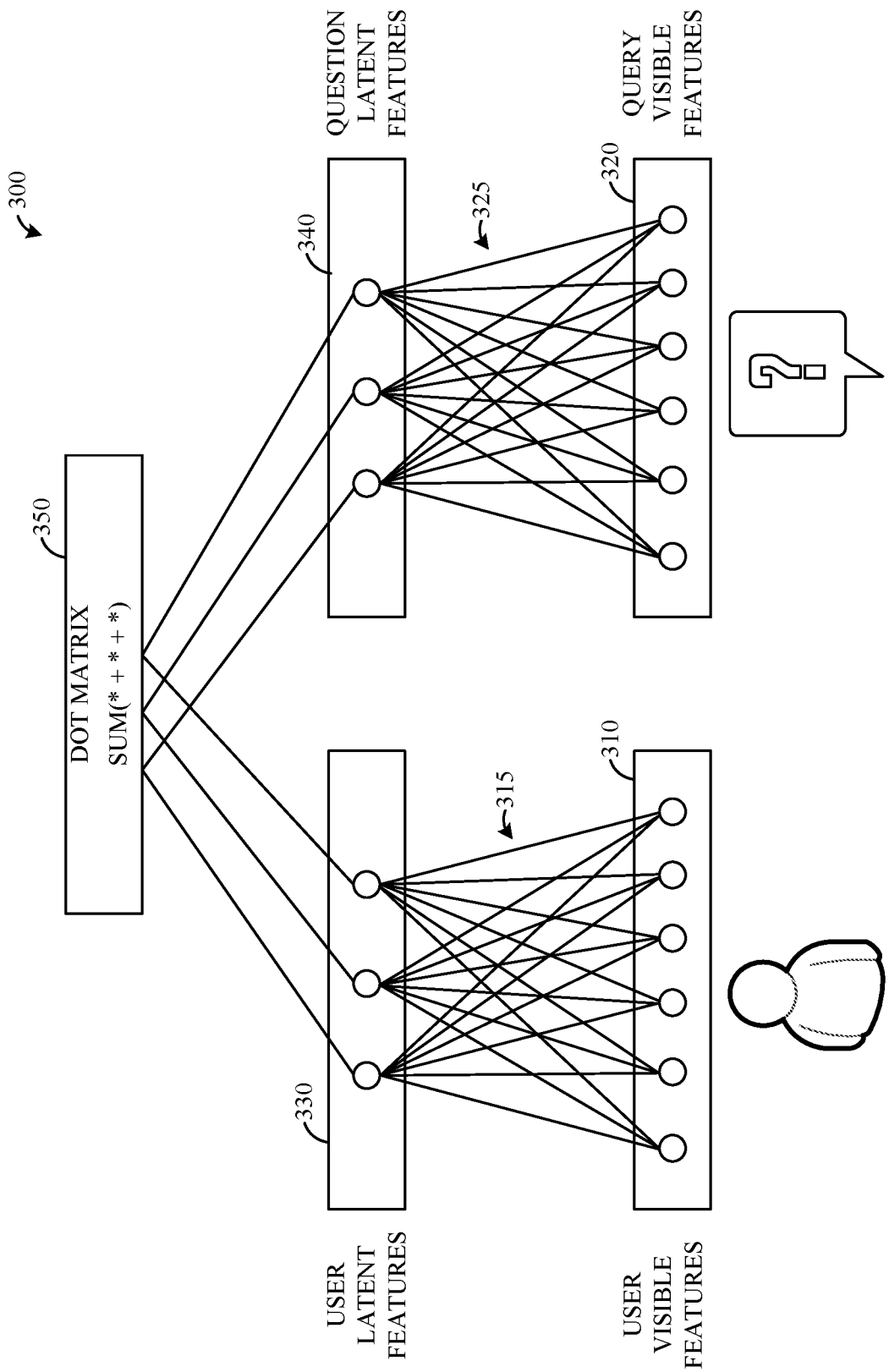
FIG. 3 illustrates a simplified query-based recommendation system using a machine learning-trained classifier, according to an implementation of the present disclosure.

FIG. 3 illustrates a simplified query-based recommendation system 300 using a machine learning-trained classifier, according to an implementation of the present disclosure. Most current recommendation systems utilize some form of collaborative filtering to produce a single scalar number for each potential relationship between a user and a product (e.g., a movie, a video clip, an e-commerce product, etc.). In collaborative filtering, each user in a system can be mapped into a latent feature space based on that user's previous interactions with products, and each product is mapped into a latent feature space based on users that expressed an interest in the product (e.g., via social media "likes"). The dot product (e.g., a mathematical operation that sums pairwise multiplications) between the product and the user can be considered as a score the user can assign to the product. The optimization process of finding the representation of each user and product aims to minimize the error (e.g., the loss) of the already-known scores that the user assigned. For example, a user may have a representation (that was learned by the system) of [1, 2, 3] and a product may have a representation of [−3, 0, 2]. The dot product can be represented as [1*−3+2*0+3*2]=3. This can mean that the recommendation system can predict that the user can assign a score of 3 to this product. The algorithm used to solve this type of technical problem can be referred to as matrix factorization, which attempts to factorate a ranking matrix (e.g., a matrix that contains the scores) into multiple matrices, such as one matrix for users and one matrix for products.

The subject technology can generate recommended suggestions for queries by finding the most likely member of an entity (e.g., an employee) to answer the query. The subject technology can represent both query and employee as vectors that are aliased as latent features, such that their dot product can yield a single scalar value as the score, at which the scalar value can be bounded between 0 and 1 and can represent the likelihood of the question to be answered by the employee.

In some implementations, an entity can be represented as N employees, where the $i^{th}$ employee can be marked as $E_i$. Queries can be generated all the time, where the $j^{th}$ query can be represented as $Q_j$. For each user associated with the entity (e.g., as an employee), there may be a set of user visible features 310 associated with the user that includes a predetermined number of visible features. For example, such user visible features 310 may include the age of the user, the seniority of the user in the entity, the education level of the user, the role of the user at the entity, etc. The role of an employee may change over time, but the employee may still carry (or have access to) information of a previous role. In this regard, the user visible features 310 may include features indicating a current role in addition to all previous roles.

Each user visible feature 310 can be notated as $F_{i,j}$, where i can refer to the $i^{th}$ employee and j can refer to the $j^{th}$ feature. In some aspects, each query may be associated with a set of query visible features 320 that includes a predetermined number of visible features from the query. In other aspects, the number of visible features from the query can be dynamically determined by the recommendation module 120.

In some implementations, the textual features in the visible feature space can be represented as a sequence of letters or words. Since most of the queries can be related to structured query language (SQL) tables and other-named algorithms, the recommendation module 120, using the text preprocessing module 206, can process the incoming user data and/or query data using a letter-by-letter sequence. Since the query visible features 320 of a query may include only words, a pre-trained language model, such as BERT, can be applied as weights initializations via the encoder module 214.

A latent representation can be achieved by applying deep learning operations over the visible feature space. For example, the machine learning-trained classifier 216 can be applied by the recommendation module 120 to the set of user visible features 310 for each employee and to the set of query visible features 320 for each query. The machine learning-trained classifier 216 can learn how to represent the query as a latent set of features of the same dimensions, so the dot product of both representations can be performed at the dot matrix module 350.

In this case, the learning algorithm can determine what is the best way to represent the visible features as a latent set of features. For example, the machine learning-trained classifier 216 can determine different latent connections (e.g., 315) between the user visible features 310 and the user latent features 330. Similarly, the machine learning-trained classifier 216 can determine different latent connections (e.g., 325) between the query visible features 320 and the query latent features 340.

The machine learning-trained classifier 216 with one or more neural networks can estimate the probability of a query Q to be answered by employee E. The machine learning-trained classifier 216 can determine the probability by finding what the latent connections (e.g., 315, 325) are to be between the latent representations of the query (e.g., the query latent features 340) and the query visible features 320, and what the latent connections are to be between the latent representations of the user (e.g., the user latent features 330) and the user visible features 310. So, the answer of what is being learned by the machine learning-trained classifier 216 are the latent connections between the visible features and the latent features, both for employee (e.g., 315) and query (e.g., 325).

To train the neural networks included in the machine learning-trained classifier 216, the recommendation module 120 can collect a relevantly large number of tuples, where each tuple contains information indicating: (Employee, Query, Likelihood scalar value indicating how likely Employee knows the answer to the Query). In some aspects, the recommendation module 120 may process the tuples of information with an optimization algorithm, such as Stochastic Gradient Descent or any other gradient-based algorithm.

To keep the machine learning-trained classifier 216 learning constantly, the recommendation module 120 can use some active learning techniques, and for each new query, the recommendation module 120 can check whether some employees know the answer for that query. One of the ways to do that is by focusing on certain cases {employee, query}, where the machine learning-trained classifier 216 has a low certainty of its predictions. This can be performed by prompting users that have a relatively large entropy of the predictions (where the highest entropy may be at 0.5/0.5 probability). The entropy of the predictions can be defined by one or more user configurations, where a relatively low threshold configuration can cause the recommendation module 120 to nudge employees at a relatively high frequency, but the more frequent client-side prompts can yield more tuples of information, and therefore, additional training data can be generated.

Figure 4:
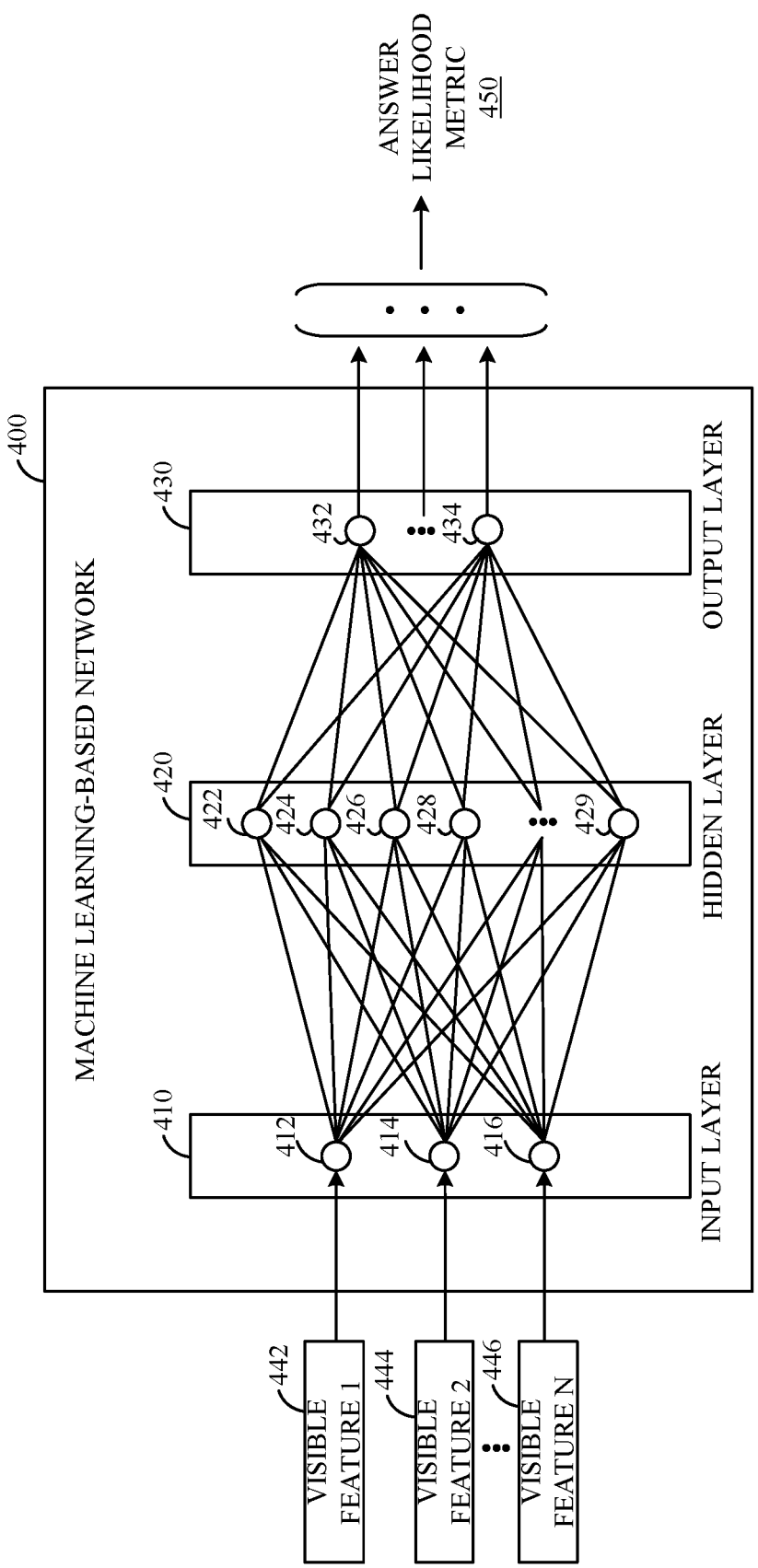
FIG. 4 is an exemplary system environment of a machine learning-based network implementing a machine learning model trained for classifications based on training data, according to an implementation of the present disclosure.

FIG. 4 is an exemplary system environment of a machine learning-based network 400 or an artificial neural network implementing a machine learning model trained for classifications based on training data (e.g., a model trained using training datasets 126 of tuples of information indicating a query, a candidate user and likelihood value that candidate can answer the query), according to an implementation of the present disclosure.

In this regard, the machine learning-trained classifier 216 shows an input layer 410, a hidden layer 420, and an output layer 430 of the artificial neural network implementing a machine learning model trained as discussed herein, where the nodes and weights for the hidden layer may be trained using one or more training data sets of tuple information for determining latent connections between the visible feature space and the latent feature space for each of query data and user data.

For example, when training machine learning-trained classifier 216, one or more training data sets of training datasets 126 for queries having different features and feature values may be processed using a supervised machine learning algorithm or technique, such as gradient boosting or random forest algorithms. In some implementations, other types of AI learning may be used, such as deep learning for neural networks. The features within training datasets 126 may include different types of variables, parameters, or characteristics of the underlying queries, which may have separate values to the variables. This allows for different classifiers of the queries and variables to be built into known or desired classifications (e.g., certain answer likelihood for a given latent connection). These classifiers are trained to detect the tuple information of training datasets 126 falling into the classifier using the machine learning technique, which allows identification of similar queries meeting a specific classification. The classifiers may be generated by the machine learning technique when identifying and grouping queries and/or users. Thus, training datasets 126 may include queries falling into specific classifications, such as an answerable query or non-answerable query. The process may be supervised where the output and classifications are known for the queries. In some implementations, the training data set may include annotated or labeled data of particular flagged queries and/or may be reviewed after processed and classified by the machine learning technique for false positives and/or correctly identified and flagged as an answerable query.

Machine learning-trained classifier 216 includes different layers and nodes to perform decision-making using the machine learning-trained classifier 216. Each of layers 410, 420, and 430 may include one or more nodes. For example, input layer 410 includes nodes 412-416, hidden layer 420 includes nodes 422-429, and output layer 430 includes nodes 432-434. In this example, each node in a layer is connected to every node in an adjacent layer. For example, node 412 in input layer 410 is connected to all of nodes 422-429 in hidden layer 420. Similarly, node 422 in the hidden layer is connected to all of nodes 412-416 in input layer 410 and nodes 432-434 in output layer 430. Although only one hidden layer is shown, it has been contemplated that a neural network used to implement the machine learning-trained classifier 216 for query-based recommendation may include as many hidden layers as desired.

In this example, machine learning-trained classifier 216 receives a set of input values (e.g., visible features 442-446) and produces an output vector (or singular value). Each node in input layer 410 may correspond to a distinct input value. For example, when a neural network is used to implement the machine learning-trained classifier 216 for query-based recommendation, each node in the input layer 410 may correspond to a distinct attribute derived from the information associated with a user device (e.g., communication device 150) or a user account. In some aspects, the information pertains to a query (e.g., a query time, query content, intended recipient (if any), local or general time/date, etc.). In a non-limiting example, node 412 receives visible feature 442 (depicted as "query feature 1") that may correspond to personal information related to a user, node 414 receives visible feature 444 (depicted as "query feature 2") that may correspond to employment information related to the user, and node 416 receives visible feature 446 (depicted as "query feature N") that may correspond to educational information related to the user. In some aspects, the nodes 412-416 may correspond to an encoded value representing a set of additional values derived from training datasets 126. In some implementations, the machine learning-trained classifier 216 may compute all the latent connections between the visible feature space and the latent feature space.

In some implementations, each of nodes 422-429 in hidden layer 420 generates a representation, which may include a mathematical computation (or algorithm) that produces a value based on the input values received from nodes 412-416. The mathematical computation may include assigning different weights to each of the data values received from nodes 412-416. In some instances, the weights can be identified based on the relevance to a particular query. For example, nodes 422-429 may include different algorithms and/or different weights assigned to the data variables from nodes 412-416 such that each of nodes 422-429 may produce a different value based on the same input values received from nodes 412-416. In some implementations, the weights that are initially assigned to the features (or input values) for each of nodes 422-429 may be randomly generated (e.g., using a computer randomizer). The values generated by nodes 422-429 may be used by each of nodes 432-434 in output layer 430 to produce an output value for machine learning-trained classifier 216. When a neural network is used to implement the machine learning-trained classifier 216 for query-based recommendation, the output value produced by the neural network may indicate a likelihood that a candidate user can answer a query by provisioning a scalar value to a latent connection between the visible features and the latent features for each of the user and the query. In some aspects, the neural network may output a vector of likelihood values, where each likelihood value pertains to a different query and/or different user.

The machine learning-trained classifier 216 may be trained by using historical electronic query data (training data). The historical electronic query data may include query records for different time periods in the past (e.g., July 2019 through March 2020, July 2018 through March 2019, July 2017 through March 2020, etc.). By providing the training data to the machine learning-based network 400, the nodes 422-429 in the hidden layer 420 may be trained (adjusted) such that an optimal output (e.g., a likelihood of a query is to be answered by a particular candidate user) is produced in the output layer 430 based on the training data. For example, the output layer 430 can produce an answer likelihood metric 450 that includes a vector of optimal outputs of the machine learning-based network 400. In some aspects, the answer likelihood metric 450 is a vector of likelihood values. In other aspects, the answer likelihood metric 450 is a singular value. By continuously providing different sets of training data and penalizing the machine learning-trained classifier 216 when the output is incorrect, the machine learning-trained classifier 216 (and specifically, the representations of the nodes in the hidden layer 420) may be trained (adjusted) to improve its performance in queries for different tuples of information over time. Adjusting the machine learning-trained classifier 216 may include adjusting the weights associated with each node in the hidden layer 420.

Although the above discussions pertain to an artificial neural network as an example of machine learning, it is understood that other types of machine learning methods may also be suitable to implement the various aspects of the present disclosure. For example, supervised machine learning, unsupervised machine learning and/or reinforcement machine learning may be implemented to perform the processes discussed herein in FIGS. 5 and 6. In some aspects, machine learning-based network 400 may be implemented by one or more types of neural networks, such as convolutional neural networks, deep neural networks, recurrent neural networks, or other suitable machine learning-based neural network. In other examples, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 5:
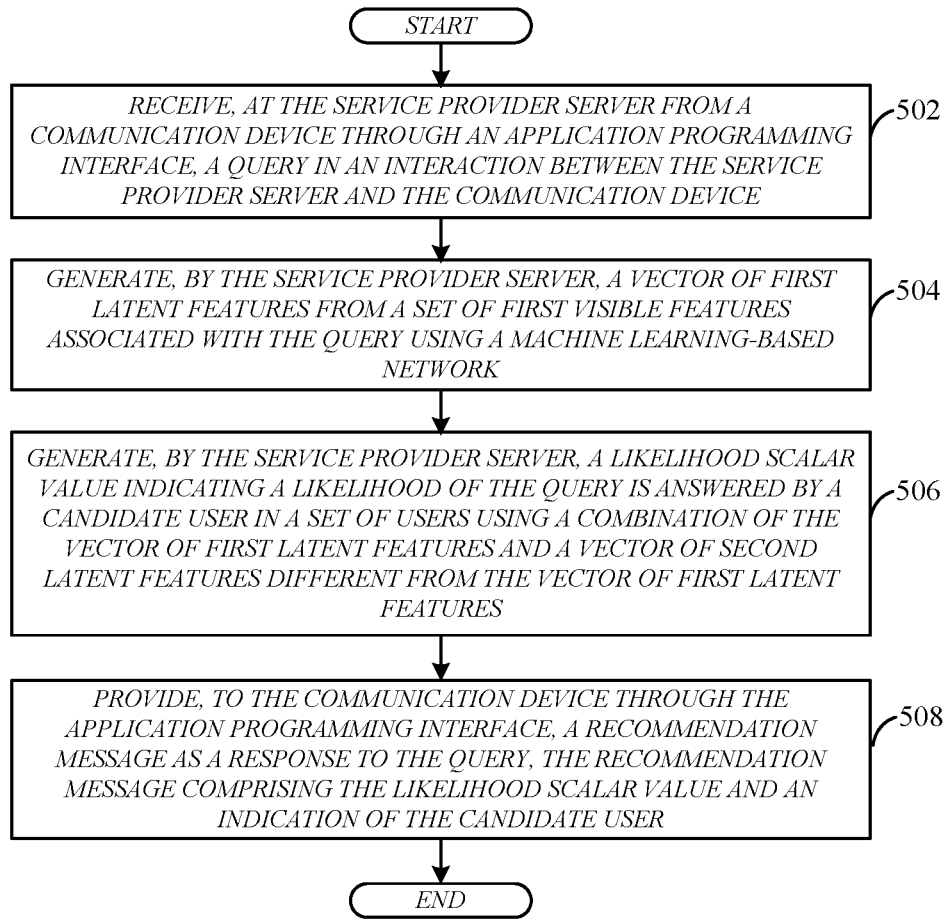
FIG. 5 is a flowchart of an example process of performing a query-based recommendation, according to an implementation of the present disclosure.

FIG. 5 is a flowchart of an example process 500 of performing a query-based recommendation, according to an implementation of the present disclosure. One or more of the steps 502-508 of process 500 may be implemented, at least in part, in the form of executable code stored on non-transitory, tangible, machine-readable media that when run by one or more processors may cause the one or more processors to perform one or more of the steps 502-508. Some examples of computing devices, such as a computing system 700 (discussed below with reference to FIG. 7) may include non-transitory, tangible, machine readable media that include executable code that when run by one or more processors (e.g., a processor 712) may cause the one or more processors to perform the steps of process 500. As illustrated, the process 500 includes a number of enumerated steps, but aspects of the process 500 may include additional steps before, after, and in between the enumerated steps. In some aspects, one or more of the enumerated steps may be omitted or performed in a different order.

The process 500 starts at step 502, where a recommendation module (e.g., the recommendation module 120) receives, from a communication device (e.g., the communication device 150) through an application programming interface (e.g., the API 202), a query in an interaction between the recommendation module 120 and the communication device 150.

Next, at step 504, the recommendation module 120 generates a vector of first latent features from a set of first visible features associated with the query using a machine learning-based network (e.g., the machine learning-trained classifier 216). In some aspects, the vector of first latent features indicates a latent representation of the set of first visible features in a same feature space as that of the set of first visible features. In some implementations, the recommendation module 120 can extract a plurality of first features from the query to generate the set of first visible features. In some aspects, the vector of first latent features includes a plurality of first latent feature fields, in which each of the plurality of first latent feature fields includes a different linear combination of the plurality of first features in the set of first visible features.

In some aspects, the recommendation module 120 can generate first visible-to-latent connections between the set of first visible features and the vector of first latent features. In some aspects, the recommendation module 120 can generate second visible-to-latent connections between the set of second visible features and the vector of second latent features. In this respect, the generating of the second visible-to-latent connections can occur concurrently with the generating of the first visible-to-latent connections.

Subsequently, at step 506, the recommendation module 120 generates a likelihood scalar value indicating a likelihood of the query is answered by a candidate user in a set of users using a combination of the vector of first latent features and a vector of second latent features different from the vector of first latent features. The recommendation module 120 also can extract a plurality of second features of the candidate user from a user profile associated with the candidate user to generate a set of second visible features for the candidate user. The recommendation module 120 can generate the vector of second latent features from the set of second visible features using the machine learning-trained classifier. In some aspects, the vector of second latent features includes latent representations of the set of second visible features. In some aspects, the vector of second latent features indicates a latent representation of the set of second visible features in a same feature space as that of the set of second visible features. In some aspects, the vector of second latent features includes a plurality of second latent feature fields, in which each of the plurality of second latent feature fields includes a different linear combination of the plurality of second features in the set of second visible features. In this regard, the plurality of first latent feature fields and the plurality of second latent feature fields may respectively include a number of latent feature fields that is adjustable by a predetermined hyperparameter.

In generating the vector of first latent features, the recommendation module 120 can generate a first embedding representation of the set of first visible features with a pre-trained language model and apply the first embedding representation to the machine learning-trained classifier to generate the vector of first latent features. In generating the vector of second latent features, the recommendation module 120 can generate a second embedding representation of the set of second visible features with the pre-trained language model and apply the second embedding representation to the machine learning-trained classifier to generate the vector of second latent features.

In generating the likelihood scalar value, the recommendation module 120 can perform a matrix dot product operation on a plurality of latent feature pairs to generate the likelihood scalar value. In some aspects, each latent feature pair of the plurality of latent feature pairs comprises a pairing between a first latent feature in the vector of first latent features and a second latent feature in the vector of second latent features. In some implementations, the recommendation module 120 applies an activation function operation to an output of the matrix dot product operation to generate the likelihood scalar value.

In some implementations, the recommendation module 120 can generate a vector of likelihood scalar values comprising a plurality of likelihood scalar values that correspond to different candidate users in the set of users. The recommendation module 120 also can generate an ordered listing of candidate users from the set of users that are associated with a respective likelihood scalar value in the vector of likelihood scalar values. In generating the ordered listing of candidate users, the recommendation module 120 can rank each likelihood scalar value in the vector of likelihood scalar values at an output of the matrix dot product operation. In some implementations, the recommendation module 120 can apply an activation function operation to the vector of likelihood scalar values to generate the vector of likelihood scalar values.

In some implementations, the recommendation module 120 can generate a tuple of information indicating the candidate user, the query, and the likelihood scalar value. In some aspects, the recommendation message is generated with the tuple of information. In other implementations, the recommendation module 120 can process the tuple of information with an iterative algorithm to optimize the tuple of information and generate training data from the optimized tuple of information. In this regard, the recommendation module 120 can train the machine learning-trained classifier 216 with the training data in an offline mode.

In some implementations, the recommendation module 120 can identify one or more candidate users in the set of users that are associated with a likelihood scalar value that does not exceed a predetermined threshold. The recommendation module 120 may send a request to communication devices of the identified one or more candidate users that prompts the one or more candidate users to answer a given query associated with the likelihood scalar value. The recommendation module 120 can receive responses from the communication devices of the identified one or more candidate users and generate additional tuples of information for the identified one or more candidate users based on the responses. The recommendation module 120 can process the additional tuples of information with an iterative algorithm to optimize the additional tuples of information and generate training data from the optimized additional tuples of information. In this regard, the recommendation module 120 can train the machine learning-trained classifier 216 with the training data in an offline mode.

Next, at step 508, the recommendation module 120 provides, to the communication device 150 through the API 202, a recommendation message as a response to the query. In some aspects, the recommendation message includes the likelihood scalar value and an indication of the candidate user.

Figure 6:
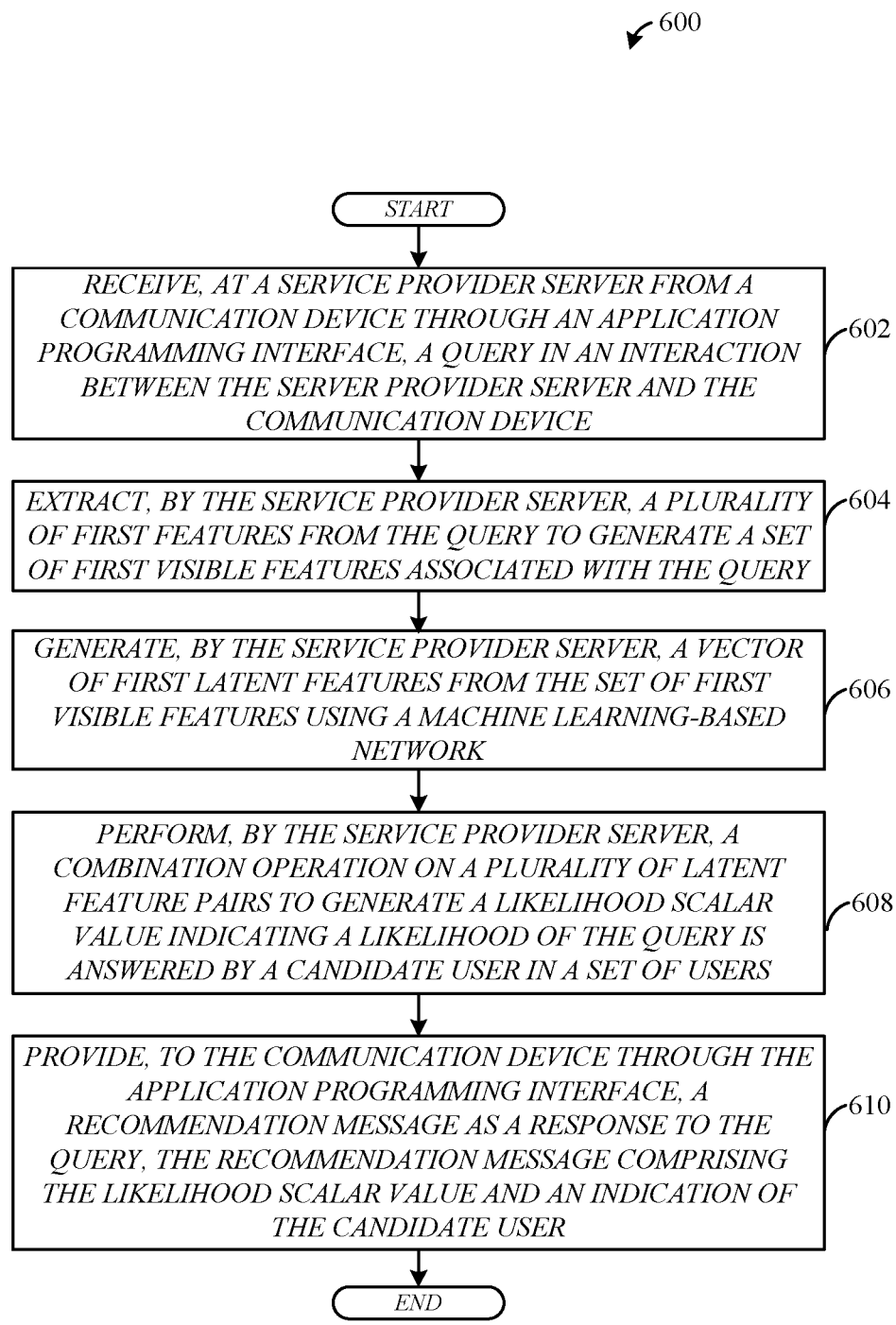
FIG. 6 is a flowchart of another example process of performing a query-based recommendation, according to an implementation of the present disclosure.

FIG. 6 is a flowchart of another example process 600 of performing a query-based recommendation, according to an implementation of the present disclosure. One or more of the steps 602-608 of process 600 may be implemented, at least in part, in the form of executable code stored on non-transitory, tangible, machine-readable media that when run by one or more processors may cause the one or more processors to perform one or more of the steps 602-608. Some examples of computing devices, such as a computing system 700 (discussed below with reference to FIG. 7) may include non-transitory, tangible, machine readable media that include executable code that when run by one or more processors (e.g., a processor 712) may cause the one or more processors to perform the steps of process 600. As illustrated, the process 600 includes a number of enumerated steps, but aspects of the process 600 may include additional steps before, after, and in between the enumerated steps. In some aspects, one or more of the enumerated steps may be omitted or performed in a different order.

The process 600 starts at step 602, where a recommendation module of a service provider server (e.g., the recommendation module 120) receives, from a communication device (e.g., the communication device 150) through an application programming interface (e.g., the API 202), a query in an interaction between the server provider server 110 and the communication device 150.

Next, at step 604, the recommendation module 120 extracts a plurality of first features from the query to generate a set of first visible features associated with the query.

Subsequently, at step 606, the recommendation module 120 generates a vector of first latent features from the set of first visible features using a machine learning-based network (e.g., the machine learning-trained classifier 216).

Next, at step 608, the recommendation module 120 performs a combination operation on a plurality of latent feature pairs to generate a likelihood scalar value indicating a likelihood of the query is answered by a candidate user in a set of users. In some aspects, each latent feature pair of the plurality of latent feature pairs includes a pairing between a first latent feature in the vector of first latent features and a second latent feature in a vector of second latent features. In other aspects, the vector of second latent features includes latent representations of visible features of the candidate user.

Subsequently, at step 610, the recommendation module 120 provides, through the API 202, a recommendation message as a response to the query. In some aspects, the recommendation message includes the likelihood scalar value and an indication of the candidate user.

Figure 7:
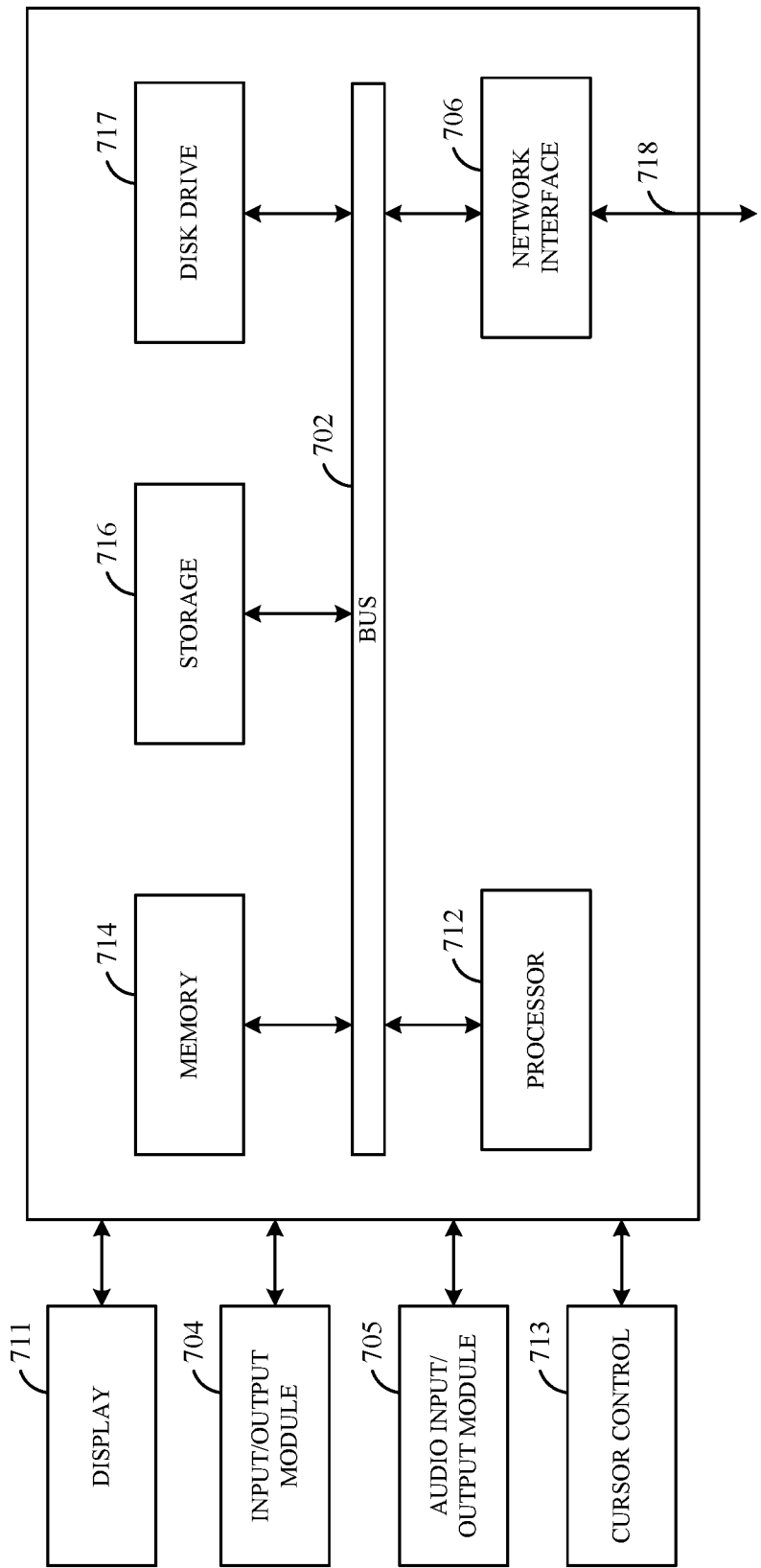
FIG. 7 is a block diagram of a computer system suitable for implementing one or more components in FIG. 1, according to an implementation.

FIG. 7 is a block diagram of a computer system 700 suitable for implementing one or more components in FIG. 1, according to an implementation. In various implementations, a computing device may include a personal computing device e.g., smart phone, a computing tablet, a personal computer, laptop, a wearable computing device such as glasses or a watch, Bluetooth device, key FOB, badge, etc.) capable of communicating with the network. The service provider server 110 may utilize a network computing device (e.g., a network server) capable of communicating with the network 160. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a service provider server via network 160. In one implementation, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that include bus 702. In one implementation, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 700. In various other implementations of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

The foregoing disclosure is not intended to limit the present disclosure to the precise forms or particular fields of use disclosed. As such, it is contemplated that various alternate implementations and/or modifications to the present disclosure, whether explicitly described or implied herein, are possible in light of the disclosure. Having thus described implementations of the present disclosure, persons of ordinary skill in the art can recognize that changes may be made in form and detail without departing from the scope of the present disclosure. Thus, the present disclosure is limited only by the claims.

What is claimed is:

1. A method, comprising:
    receiving, at a service provider server from a communication device through an application programming interface, a query in an interaction between the server provider server and the communication device;
    generating, by the service provider server and using a machine learning-trained classifier, a vector of first latent features from a set of first visible features associated with the query;
    generating, by the service provider server and using the machine learning-trained classifier, a vector of second latent features from a set of second visible features for a candidate user in a set of users, wherein the vector of second latent features comprises latent representations of a set of second visible features for the candidate user;

generating, by the service provider server, a likelihood scalar value between a first specified number and a second specified number, the likelihood scalar value indicating a likelihood that the query is answered by the candidate user using a combination of the vector of first latent features and the vector of second latent features, wherein the likelihood scalar value is generated at least in part by performing a matrix dot product operation on a plurality of latent feature pairs, and wherein each latent feature pair of the plurality of latent feature pairs comprises a pairing between a first latent feature in the vector of first latent features and a second latent feature in the vector of second latent features; and providing, to the communication device through the application programming interface, a recommendation message as a response to the query, the recommendation message comprising the likelihood scalar value and an indication of the candidate user.

2. The method of claim 1, further comprising:

extracting, by the service provider server, a plurality of first features from the query to generate the set of first visible features;

extracting, by the service provider server, a plurality of second features of the candidate user from a user profile associated with the candidate user; and generating, based on the extracted plurality of second features, the set of second visible features for the candidate user.

3. The method of claim 2, wherein:

the generating the vector of first latent features comprises generating first visible-to-latent connections between the set of first visible features and the vector of first latent features, the generating the vector of second latent features comprises generating second visible-to-latent connections between the set of second visible features and the vector of second latent features, and the generating the second visible-to-latent connections occurs concurrently with the generating the first visible-to-latent connections.

4. The method of claim 2, wherein:

the first specified number is 0;

the second specified number is 1;

the vector of first latent features indicates a latent representation of the set of first visible features in a same feature space as that of the set of first visible features, and the vector of second latent features indicates a latent representation of the set of second visible features in a same feature space as that of the set of second visible features.

5. The method of claim 2, wherein:

the generating the vector of first latent features comprises:
generating a first embedding representation of the set of first visible features with a pre-trained language model, and
applying the first embedding representation to the machine learning-trained classifier to generate the vector of first latent features, and the generating the vector of second latent features comprises:
generating a second embedding representation of the set of second visible features with the pre-trained language model, and applying the second embedding representation to the machine learning-trained classifier to generate the vector of second latent features.

6. The method of claim 2, wherein the vector of first latent features includes a plurality of first latent feature fields, wherein each of the plurality of first latent feature fields includes a different linear combination of the plurality of first features in the set of first visible features.

7. The method of claim 6, wherein:

the vector of second latent features includes a plurality of second latent feature fields, each of the plurality of second latent feature fields includes a different linear combination of the plurality of second features in the set of second visible features, and the plurality of first latent feature fields and the plurality of second latent feature fields respectively include a number of latent feature fields that is adjustable by a predetermined hyperparameter.

8. The method of claim 1, wherein the generating the likelihood scalar value further comprises:

applying an activation function operation to an output of the matrix dot product operation to generate the likelihood scalar value.

9. The method of claim 1, further comprising:

generating a vector of likelihood scalar values comprising a plurality of likelihood scalar values that correspond to different candidate users in the set of users; and generating an ordered listing of candidate users from the set of users that are associated with a respective likelihood scalar value in the vector of likelihood scalar values.

10. The method of claim 9, wherein:

the generating the vector of likelihood scalar values comprises applying an activation function operation to the vector of likelihood scalar values; and the generating the ordered listing of candidate users comprises ranking each likelihood scalar value in the vector of likelihood scalar values at an output of the matrix dot product operation.

11. The method of claim 1, further comprising, before the generating the vector of first latent features:

representing textual features of the set of first visible features as a sequence of letters or words; and processing the sequence of letters or words using a pre-trained language model, wherein the vector of first latent features is generated based on the processing of the sequence of letters or words.

12. The method of claim 1, further comprising:

generating a tuple of information indicating the candidate user, the query, and the likelihood scalar value; and generating the recommendation message with the tuple of information.

13. The method of claim 12, further comprising:

processing the tuple of information with an iterative algorithm to optimize the tuple of information and generate training data from the tuple of information; and training the machine learning-trained classifier with the training data in an offline mode.

14. The method of claim 1, further comprising:

identifying one or more candidate users in the set of users that are associated with a likelihood scalar value that does not exceed a predetermined threshold;

sending, by the service provider server through the application programming interface, a request to communication devices of the one or more candidate users that prompts the one or more candidate users to answer a given query associated with the likelihood scalar value;

receiving, by the service provider server through the application programming interface, responses from the communication devices of the one or more candidate users;

generating additional tuples of information for the one or more candidate users based on the responses;

processing the additional tuples of information with an iterative algorithm to optimize the additional tuples of information and generate training data from the additional tuples of information; and training the machine learning-trained classifier with the training data in an offline mode.

15. The method of claim 1, further comprising, before the generating the vector of first latent features:

transforming data associated with the query into a specified format; and inputting the data associated with the query in the specified format to the machine learning-trained classifier.

16. A system comprising:

a non-transitory memory; and one or more hardware processors coupled to the non-transitory memory and configured to read instructions from the non-transitory memory to cause the system to perform operations comprising:

receiving, at a service provider server from a communication device through an application programming interface, a query in an interaction between the server provider server and the communication device;

extracting, by the service provider server, a plurality of first features from the query to generate a set of first visible features associated with the query;

generating, by the service provider server, a vector of first latent features from the set of first visible features using a machine learning-trained classifier;

combining, by the service provider server, a vector of first latent features and a vector of second latent features of a set of second visible features for a candidate user of a set of users into a plurality of latent feature pairs;

generating a likelihood scalar value at least in part by performing a matrix dot product operation on the plurality of latent feature pairs, wherein the likelihood scalar value is between a first number corresponding to a 0% probability and a second number corresponding to a 100% probability, such that the likelihood scalar value indicates a likelihood between 0% probability and 100% probability that the query is answered by the candidate user; and providing, to the communication device through the application programming interface, a recommendation message as a response to the query, the recommendation message comprising the likelihood scalar value and an indication of the candidate user.

17. The system of claim 16, wherein the operations further comprise:

extracting, by the service provider server, a plurality of second features of the candidate user from a user profile associated with the candidate user;

generating, based on the extracted plurality of second features, the set of second visible features for the candidate user; and generating, by the service provider server, the vector of second latent features from the set of second visible features using the machine learning-trained classifier, wherein:

the generating the vector of first latent features comprises generating first visible-to-latent connections between the set of first visible features and the vector of first latent features, the generating the vector of second latent features comprises generating second visible-to-latent connections between the set of second visible features and the vector of second latent features, and the generating the second visible-to-latent connections occurs concurrently with the generating the first visible-to-latent connections.

18. The system of claim 16, wherein the operations further comprise:

generating a vector of likelihood scalar values comprising a plurality of likelihood scalar values that correspond to different candidate users in the set of users; and generating an ordered listing of candidate users from the set of users that are associated with a respective likelihood scalar value in the vector of likelihood scalar values, wherein the generating the ordered listing of candidate users comprises ranking each likelihood scalar value in the vector of likelihood scalar values.

19. A non-transitory machine-readable medium having stored thereon machine-readable instructions executable to cause a machine to perform operations comprising:

receiving, at a service provider server from a communication device through an application programming interface, a query in an interaction between the server provider server and the communication device;

extracting, by the service provider server, a plurality of first features from the query to generate a set of first visible features associated with the query;

generating, by the service provider server, a vector of first latent features from the set of first visible features using a machine learning-trained classifier;

performing, by the service provider server, a matrix dot product operation on a plurality of latent feature pairs to generate, for a plurality of candidate users, a respective likelihood scalar value between a first specified probability and a second specified probability, such that each respective likelihood scalar value indicates a respective likelihood of the query being answered by each of the candidate user, wherein each latent feature pair of the plurality of latent feature pairs comprises a pairing between a first latent feature in the vector of first latent features and a second latent feature in a vector of second latent features, wherein the vector of second latent features comprises latent representations of visible features of the candidate user; and providing, to the communication device through the application programming interface, a recommendation message as a response to the query, the recommendation message comprising the likelihood scalar value and an indication of the candidate user.

20. The non-transitory machine-readable medium of claim 19, wherein the operations further comprise:

generating a vector of likelihood scalar values comprising a plurality of the respective likelihood scalar values; and generating an ordered listing of the plurality of candidate users, wherein the generating the ordered listing of candidate users comprises ranking each likelihood scalar value in the vector of likelihood scalar values at an output of the matrix dot product operation.

\* \* \* \* \*